June 16, 1931.  E. M. CRAWFORD  1,810,346

MOVING PICTURE SCREEN

Filed June 17, 1929

Inventor
Edward M. Crawford

By Hardway & Cathey
Attorneys

Patented June 16, 1931

1,810,346

UNITED STATES PATENT OFFICE

EDWARD M. CRAWFORD, OF HOUSTON, TEXAS

MOVING PICTURE SCREEN

Application filed June 17, 1929. Serial No. 371,666.

This invention relates to new and useful improvements in a moving picture screen.

One object of this invention is to provide a screen of the character described of such construction that pictures projected thereon will have a stereoscopic appearance.

Another object of the invention is to provide a rotatable screen whose surface may be varied in its relation to the picture projecting machine or, portions, or sections of whose surface may be varied in their various positions relative to each other to the end that as the screen is rapidly rotated the picture receiving surface will, apparently, have depth thus giving a stereoscopic, or relief, effect to the pictures projected thereon.

With the above and other objects in view this invention has particular relation to certain novel features of construction, operation, and arrangement of parts an example of which is given in this specification and illustrated in the accompanying drawings, wherein:—

Figures 3, 4, 5, and 6, respectively show various positions the screen may be made to assume relative to its axis of rotation.

Figure 8:
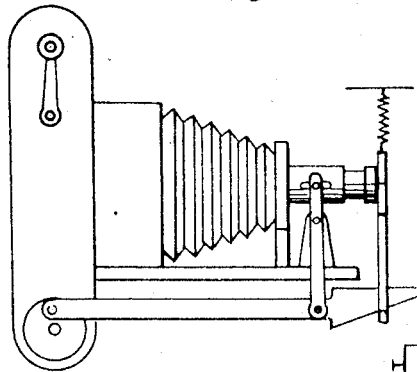
Figure 7:
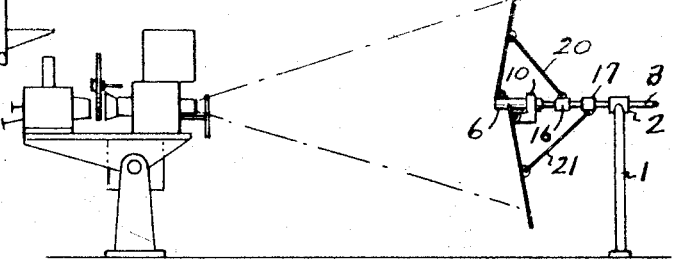

Figure 7 shows the screen in its relation to a projecting machine, and Figure 8 shows a type of camera referred to.

Referring now more particularly to the drawings, wherein like numerals of reference designate similar parts in each of the figures the numerals 1, 1, designate suitable bearing supports having the aligned bearings 2, 2 in which the screen shaft 3 is rotatably mounted. A circular screen composed of the upper and lower section 4, and 5 is mounted on the forward end of this shaft. Splined, or otherwise secured, on the forward end of said shaft 3 there is a sleeve 6 which has the lateral bearing members 7, 7 aligned with similar bearing members 8, 8 carried by the rear face of the screen section 4 and a pintel 9 extends through said aligned bearing members and forms a hinge connection between them. On the sleeve 6 there is a collar 10 which may be adjusted end-wise on said sleeve and secured thereon at any desired place by the set bolt 11.

This collar has the depending forwardly extending arm 12 whose forward end has the spaced bearing members 13 aligned with bearing members 14 on the rear side of the screen section 5. A pintel 15 extends through bearings in the members 13 and 14 and forms a hinge connection between them.

On the shaft 3 there are the adjustable collars 16, 17, which may be fixed against adjustment on said shaft by means of the respective set bolts 18, 19. The collars 16, 17 are connected to the screen sections 4, 5, through the respective links 20, 21 whose ends are pivoted to said respective collars and to the rear sides of the corresponding screen sections 4, 5.

Figure 1:
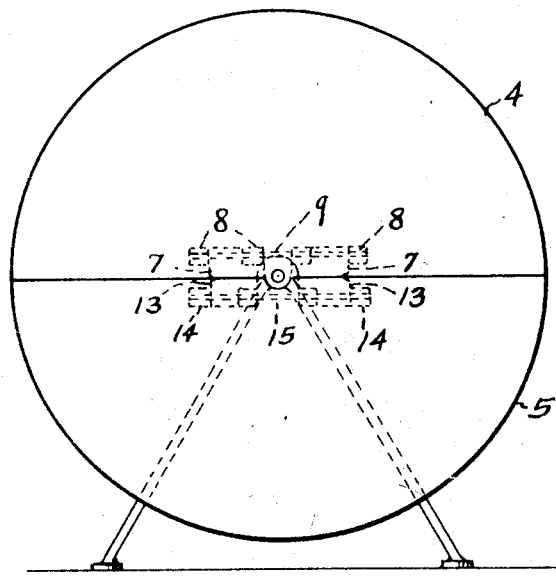
Figure 1 shows a front elevation of the screen.
Figure 2:
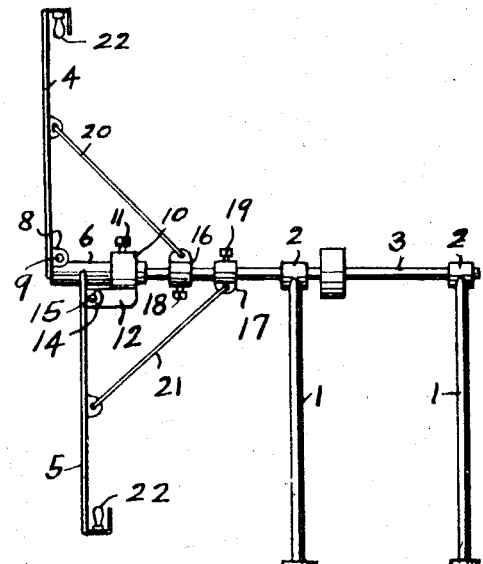
Figure 2 shows an edge view thereof.
Figures 3, 4:
Figures 5, 6:

It is obvious that by loosening the bolts 11, 19 the section 5 may be adjusted into offset relation with respect to, and located behind, the section 4, as shown in Figure 2, or flush with said section 4, as shown in Figure 3, and said bolts 11, 19 then tightened to secure said section 5 in said selected position. By suitably adjusting the collar 16, the upper section 4 may be adjusted to a selected angular position relative to the section 5, as shown in Figure 4, and by suitably adjusting said collars 16, 17 the sections 4, 5 may be adjusted into position in the same plane which is oblique relative to the axis of rotation, as shown in Figure 5, or into different planes oblique to said axis, as shown in Figure 6. And in an obvious manner the sections 4, 5 may be adjusted into offset relation to each other and into oblique position relative to the axis of rotation.

In use the screen is rapidly rotated, preferably at a rate of sixteen rotations, or more, per second. If the sections 4, 5 are in the same plane and at right angles to the axis of rotation the same effect will be produced as when the ordinary screen is used. If the sections of the screen are offset and at right angles to the axis of rotation, as shown in Figure 2, when the screen is rapidly rotated the illusory effect of two visible screens, one behind the other, will be created and the projected pictures will be seen on both screens thus giving a depth, or stereoscopic effect. Substantially the same results will be obtained when ordinary pictures are projected onto the screen when its sections are adjusted into the relative positions shown in Figure 4 with one section at right angles to the axis of rotation and the other section tilted backwardly to an oblique position there will be the illusory effect of a vertical screen and another screen behind it having thickness at its margin and tapering down to the vertical plane at its center. When the screen sections are adjusted to the positions shown in Figures 5 to 7 inclusive an illusory effect will be produced of a screen having thickness and a depth effect, or stereoscopic effect, will be given to the projected pictures.

In addition to the above it is further contemplated that both sections, 4 and 5, of the screen may be colored. This color effect may be accomplished in any one of various ways; a pigment may be used to color each section; or a colored translucid substance, as glass or gelatin, may be used; or a colored translucid substance may be superimposed over a pure white or mirrored back ground; or ground glass may be employed with suitably colored electric lights as 22 behind the respective sections.

By way of illustration, one of the screen sections, say the one furthermost from the projecting machine, may have a blue-green color, and the other section may have a yellow-red orange color.

It is also contemplated that a special type of film may be used in which the pictures are arranged in pairs, one picture of each pair having a different focal length from the other, the pictures of said pair being preferably arranged alternately, but they may be arranged alongside each other. In either case the pictures of each pair are to be alternately projected. The picture of the long focal lengths may be taken through a yellow red orange filter and projected with light filtered through a yellow-red orange filter add will therefore register only on the blue green screen and will not be visible on the yellow-red orange screen. The pictures of the short focal lengths may be taken through a blue-green filter and projected with light filtered through a blue green filter and therefore will register only on the yellow-red orange screen and will not register on the blue-green screen.

The pictures of long and short focal distances will be alternately projected the former being projected on the rear screen and the latter being projected on the screen in front, and so that they will be superimposed, the one upon the other, and owing to the speed at which the pictures are projected they will appear as one picture to the eye, due to the persistence of vision. A stereoscopic effect will thus be given with natural colors due to the blending of colors of the front and back pictures.

It is true that a special type of camera will have to be employed to make the picture film above referred to and a suitable type of projecting machine will have to be employed to project the pictures as described, but the invention herein described is concerned primarily with the screen on which the various types of pictures adverted to are to be projected.

The drawings and description disclose what is now considered to be a preferred form of the invention, by way of illustration, while the broad principle of the invention will be defined by the appended claims.

What I claim is:

1. A rotatable screen formed of sections, said sections being adjustable along a tranverse axis into different planes of rotation and means for rotating the screen.

2. A rotatable screen for receiving moving pictures formed of sections one of said sections being disposed in a plane of rotation different from that of the other section and means for rotating the screen.

3. A rotatable screen for receiving projected pictures and being formed of sections, said sections being adjustable into different planes of rotation and means for rotating the screen.

In testimony whereof I have signed my name to this specification.

EDWARD M. CRAWFORD.